(12) United States Patent
Cooke

(10) Patent No.: US 7,597,638 B2
(45) Date of Patent: Oct. 6, 2009

(54) TRANSMISSION

(75) Inventor: James A. Cooke, Martinez, CA (US)

(73) Assignee: SRAM, LLC, Chicago, IL (US)

( * ) Notice: Subject to any disclaimer, the term of this patent is extended or adjusted under 35 U.S.C. 154(b) by 672 days.

(21) Appl. No.: 10/711,193

(22) Filed: Aug. 31, 2004

(65) Prior Publication Data

US 2006/0058131 A1    Mar. 16, 2006

(51) Int. Cl.
*F16H 9/00* (2006.01)
*F16H 55/30* (2006.01)

(52) U.S. Cl. .............................. 474/78; 474/80; 474/81; 474/83; 474/84; 74/372; 74/371; 74/349

(58) Field of Classification Search ............. 474/80–84, 474/78; 74/78, 371, 372, 349; 280/236
See application file for complete search history.

(56) References Cited

U.S. PATENT DOCUMENTS

| 625,835 | A | * | 5/1899 | Davis ........................... 74/349 |
| 5,404,768 | A | * | 4/1995 | Hwang et al. .................. 74/371 |
| 5,553,510 | A | | 9/1996 | Balhorn |
| 5,611,556 | A | | 3/1997 | Davidow |
| 5,979,924 | A | * | 11/1999 | D'Aluisio et al. ........... 280/261 |
| 2004/0067804 | A1 | | 4/2004 | Dratewski |
| 2004/0130120 | A1 | | 7/2004 | Matsumoto et al. |

FOREIGN PATENT DOCUMENTS

| CH | 128 353 | 10/1928 |
| CN | 2148022 Y | 12/1993 |
| DE | 10 09 514 | 5/1957 |
| DE | 39 08 385 C1 | 6/1990 |
| DE | 40 27 351 | 3/1992 |
| EP | 1 418 120 | 5/2004 |
| FR | 2758123 A1 | 7/1998 |
| GB | 444 433 | 3/1936 |
| WO | WO 02/08050 A1 | 1/2002 |

* cited by examiner

*Primary Examiner*—Robert A Siconolfi
*Assistant Examiner*—Mahbubur Rashid
(74) *Attorney, Agent, or Firm*—Milan Milosevic; Lisa Serdynski

(57) ABSTRACT

A transmission including an input cog assembly mounted to an input shaft and an output cog assembly mounted to an output shaft. The input and output cog assemblies include a plurality of varying diameter input and output cogs, respectively, arranged sequentially. A chain links a pair of input and output cogs for transmitting power from the input cog assembly to the output cog assembly. The chain, in operation, has a high-tension side and a low-tension side. A derailleur is engageable with the low-tension side of the chain to laterally urge the chain from a current output cog to a destination output cog. The input and output cog assemblies are disposed in close proximity to each other and in a complementary arrangement relative to each other with the plurality of input cogs substantially aligned with the plurality of output cogs in a paired arrangement such that in operation the high-tension side of the chain automatically shifts to the input cog directly opposite the destination output cog after the derailleur laterally displaces the chain from the current output cog to the destination output cog.

14 Claims, 8 Drawing Sheets

TRANSMISSION

BACKGROUND OF THE INVENTION

The present invention relates to transmissions and more particularly to a transmission that includes input and output cog assemblies in close proximity to each other and a derailleur that engages a chain linking the input and output cog assemblies on a low-tension side of the chain to laterally displace the chain between a pair of input and output cogs.

A common type of transmission is a bicycle transmission that typically includes a multi-chainring crankset or input cogs at the pedal or crank axis, a multi-sprocket cassette or output cogs at the rear wheel axis, and a drive chain connecting a selected chainring to a selected sprocket. Front and rear derailleurs are used to urge the drive chain between the various chainrings and sprockets, respectively, to achieve a desired gear ratio. One disadvantage with this configuration is that in order to achieve certain gear ratios, i.e. a large front chainring connected to a large rear sprocket or a small front chainring to a small rear sprocket, the chain must be oriented at extreme "crossover" angles. Crossover riding may cause undesirable rasping noises and premature wear of the chain as well as the crankset and the cassette. Another disadvantage of this transmission is a large amount of chain slack, resulting in chain suck, chain derailment and cog skipping. Yet another disadvantage of this transmission is that two shifters are needed to actuate the front and rear derailleurs. Further disadvantages are exposed shifting components and overlapping gear ratios. For example, a conventional twenty-four speed bicycle transmission has only thirteen unique gear ratios. Therefore, there is a need for a transmission that eliminates the above disadvantages.

SUMMARY OF THE INVENTION

The present invention provides a transmission that includes an input cog assembly mounted to an input shaft, an output cog assembly mounted to an output shaft located in close proximity to the input cog assembly and a chain linking the input cog assembly and the output cog assembly. The input and output shafts are located substantially parallel to each other. The input and output cog assemblies include a plurality of cogs having varying diameters arranged sequentially and in a complementary arrangement relative to each other. Gear ratios consist of a pair of cogs, one input cog and one output that is in substantial alignment with the input cog. With this configuration, the chain laterally displaces between a pair of cogs keeping the chain substantially parallel to the cogs, eliminating the crossover angle. Further, by having the input and output cogs in a complementary arrangement relative to each other, the chain length compensation is kept to a minimum because each pair of input and output cogs has almost the same number of total of teeth. The total number of teeth of each pair of input and output cogs does not have to be exactly the same.

The chain is laterally urged between pairs of cogs by a derailleur. The derailleur engages the low-tension side of the chain to laterally urge the chain from a current output cog to a destination output cog. The input and output cog assemblies are disposed in close proximity to each other and in a complementary arrangement relative to each other with the plurality of input cogs substantially aligned with the plurality of output cogs in a paired arrangement such that in operation the high-tension side of the chain automatically shifts to the input cog directly opposite the destination output cog after the derailleur laterally displaces the chain from the current output cog to the destination output cog.

In one embodiment of the present invention, the transmission is for a bicycle. The transmission further includes an input device that is a pedal crank assembly concentric with the output shaft and an output device connected to the output shaft. A crank input cog is concentric with the output shaft and a crank output cog is mounted to the input shaft and are connected to each other by a first flexible torque-transmitting element or a crank chain, to transfer rotation from the cranks to the input shaft. The output device is a bicycle wheel connected to the output shaft with a second flexible torque-transmitting element or a final drive chain that links a wheel input cog mounted to the output shaft and a wheel output cog mounted on a hub of the wheel. A housing is mountable to the bicycle frame and encloses at least a portion of the output and input cog assemblies. Accordingly, the wheel is driven by rotating the crank assembly, which rotates the crank input cog thereby rotating the crank output cog on the input shaft through the first flexible torque-transmitting element, which in turn rotates the input shaft thereby rotating the output shaft thorough the chain between a pair of input and output cogs, which in turn rotates the wheel input cog, which rotates the rear wheel through the second flexible torque-transmitting element linking the wheel input and output cogs.

Another embodiment of the present invention is similar to the above embodiment, except that the first flexible torque-transmitting element, crank input and output cogs have been eliminated by locating the crank assembly to be concentric with the input shaft rather than the output shaft. Accordingly, the wheel is driven by rotating the crank assembly, which rotates the input shaft thereby rotating the output shaft thorough the chain linking a pair of input and output cogs, which in turn rotates the wheel input cog, which rotates the wheel through the second flexible torque-transmitting element connecting the wheel input and output cogs.

An advantage of the present invention is that the final drive chain is less likely to fall of under extreme riding conditions because the chain tension between the wheel input cog and the wheel output cog is constant.

Another advantage of the present invention is that the chain line between the wheel input cog and the wheel output cog is in substantial alignment, resulting in improved efficiency and wear.

Another advantage of the present invention is that the wheel is stronger because only a single cog is mounted on the wheel hub, eliminating triangulated spokes caused by multiple cogs mounted on the wheel.

Another advantage of the present invention is that that chain torque to the rear suspension does not change between gear ratios because the wheel input cog and the wheel output cog are the same size.

Another advantage of the present invention is that only one shifter and one derailleur is required to shift between gear ratios, rather than two shifters and two derailleurs.

Another advantage of the present invention is that there is not overlap in gear ratio ranges. Only fourteen gear ratios are needed to obtain the same overall gear range of a conventional twenty-four speed transmission.

Another advantage of the present invention is that the bicycle transmission may be enclosed reducing damage to the components of the transmission.

These and other features and advantages of the present invention will be more fully understood from the following description of certain embodiments of the invention, taken together with the accompanying drawings.

DETAILED DESCRIPTION

Figure 1:
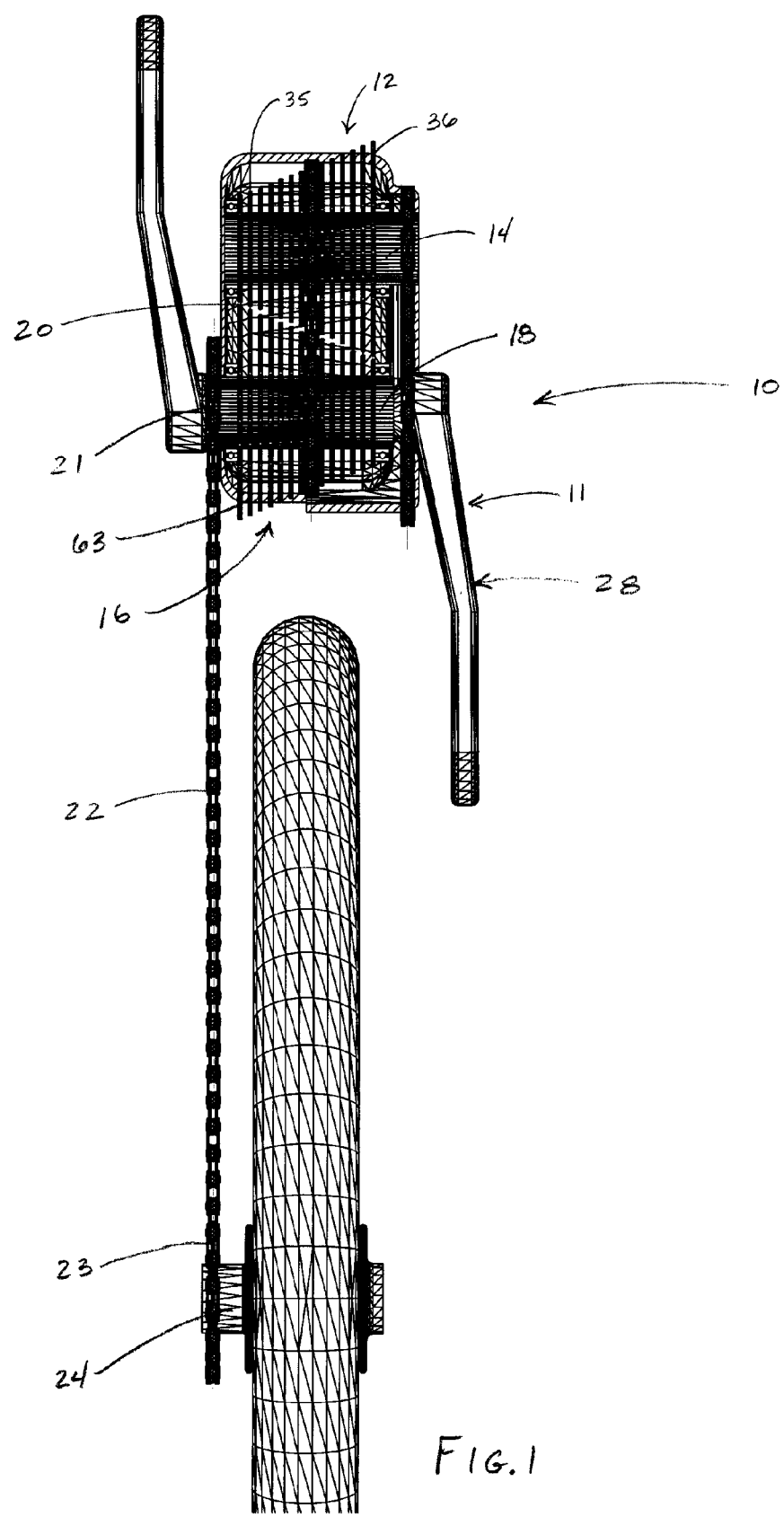
FIG. 1 is a rear view of a transmission in accordance with one embodiment of the present invention.
Figure 2:
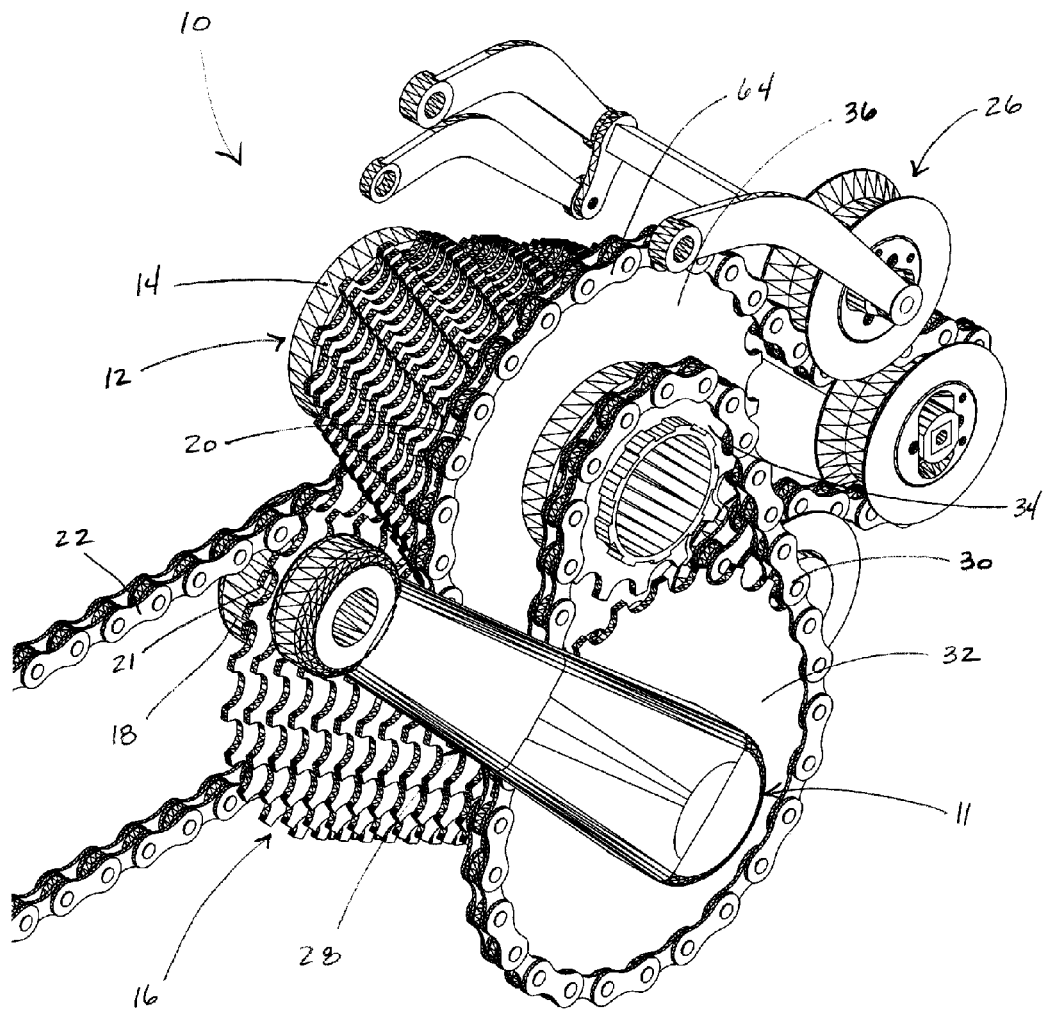
FIG. 2 is a side view of the transmission of FIG. 1.

FIGS. 1-7 illustrate a transmission 10 in accordance with one embodiment of the present invention. Although the figures depict the transmission as a bicycle transmission, it is understood that the transmission may be used for a variety of applications. The bicycle transmission 10 generally includes an input device 11, an input cog assembly 12 mounted to an input shaft 14, an output cog assembly 16 mounted to an output shaft 18, a chain 20 linking the input and output cog assemblies 12, 16, a second flexible torque-transmitting torque element or a final drive chain 22 linking a wheel input cog 21 on the output shaft 18 and a wheel output cog 23 on a wheel hub or output device 24, and a derailleur 26 for laterally urging the chain 20 between pairs of input and output cogs.

In this embodiment of the present invention, the input device 111 is a crank assembly 28 that is concentric with the output shaft 18. The crank assembly 28 may be connected to bicycle pedals (not shown). A first flexible torque-transmitting element or a crank chain 30 links a crank input cog 32 concentric with the input shaft 18 and a crank output cog 34 located on the input shaft 14 to transfer crank rotation to the input shaft 14. The first and second flexible torque-transmitting elements need not be a chain, but may be any type of flexible mechanical member such as a belt. By providing the crank input and output cogs 32, 34, the input shaft 14 rotates faster than the crank assembly 28, resulting in the chain 20 shifting faster between a pair of input and output cogs. A housing 35 encloses the derailleur 26 and the input and output cog assemblies 12, 16 to keep contaminates out of the bicycle transmission 10. The housing 35 may be mounted to the chain stay (not shown) of the bicycle.

The input and output shafts 14, 18 are located substantially parallel to each other. The input and output cog assemblies 12, 16 include a plurality of input and output cogs 36-49 and 50-63, respectively, having varying diameters arranged sequentially. Further, the input and output cog assemblies 12, 16 are disposed in close proximity to each other and in a complementary arrangement relative to each other. In this embodiment of the present invention, the input cogs 36-49 are arranged sequentially from small to large diameters and the output cog assemblies 50-63 are arranged sequentially from large to small diameters. Alternatively, one of the input and output cog assemblies may include a plurality of cogs having the same sized diameters. Gear ratios consist of a pair of cogs, for example, input cog 42 and output cog 56 that are in substantial alignment with each other define a gear ratio. With this configuration, the chain 20 displaces laterally between two pairs of cogs 42, 56 and 43, 57 keeping the chain 20 substantially parallel to the cogs 42, 43, 56, 57 eliminating the crossover angle. Further, by having the input and output cogs 36-49 and 50-63 in complementary arrangement relative to each other, the chain length compensation is kept to a minimum because each pair of input and output cogs has a similar number of total teeth. The number of total teeth of each pair of input and output cogs does not have to be equal.

The chain 20 is laterally urged between output cogs 50-63 by the derailleur 26. The derailleur 26 may be operatively connected to a shifter (not shown) remotely located on the handlebars of the bicycle by a control cable (not shown) extending therebetween. Looking to FIGS. 2-6, in operation, the chain 20 has a low-tension side 64 and a high-tension side 66. The derailleur 26 is configured to engage the low-tension side 64 to displace the chain 20 between output cogs 50-63. Because of the close proximity of the input and output cog assemblies, the high-tension side 66 of the chain 20 automatically shifts between the corresponding input cogs 36-49 after the derailleur laterally displaces the chain 20 between output cogs 50-63.

Figure 3:
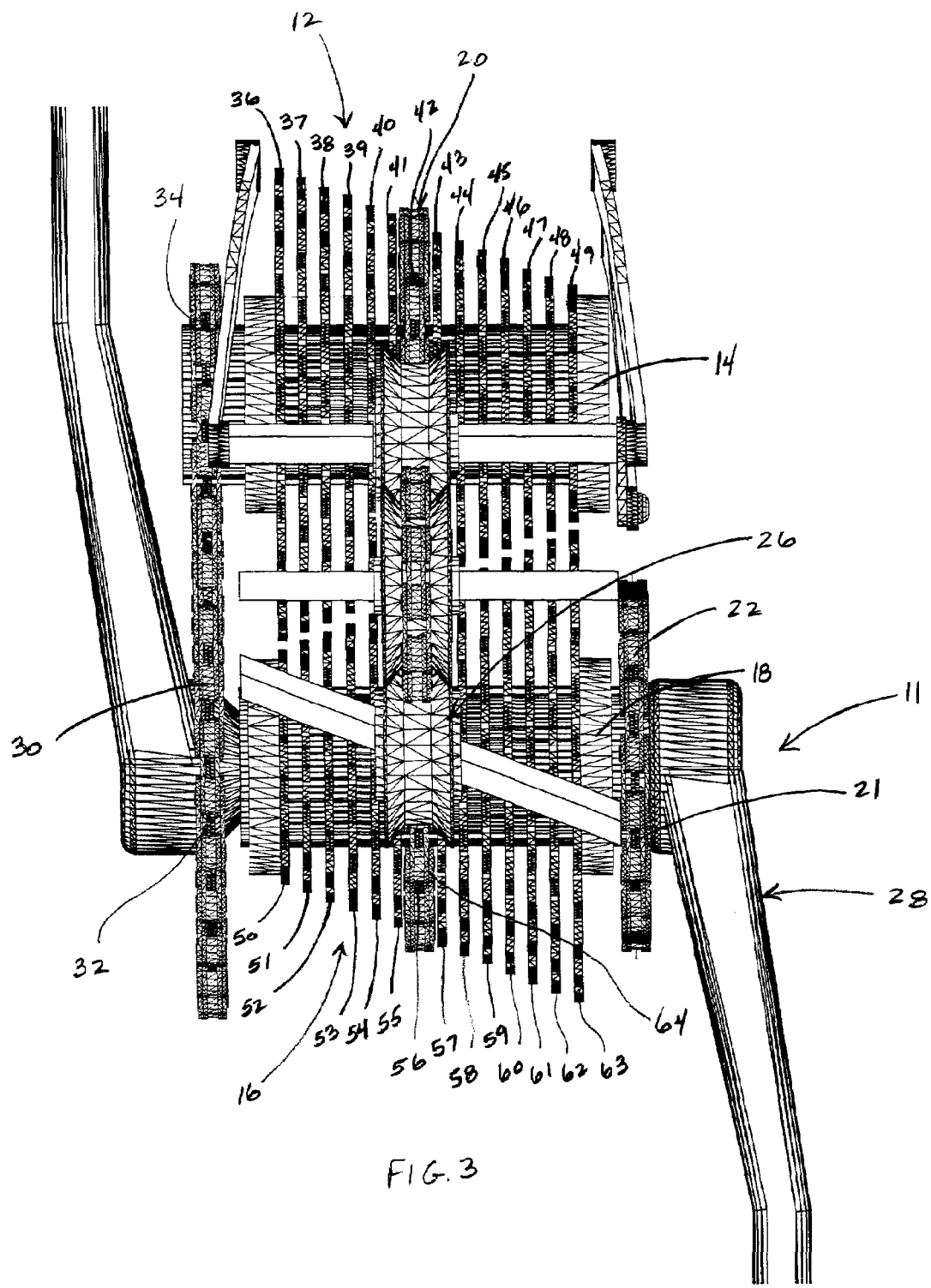
FIG. 3 is a front view of the transmission of FIG. 1 showing a derailleur engaging a low-tension side of a chain at the beginning of a shift operation.
Figure 4:
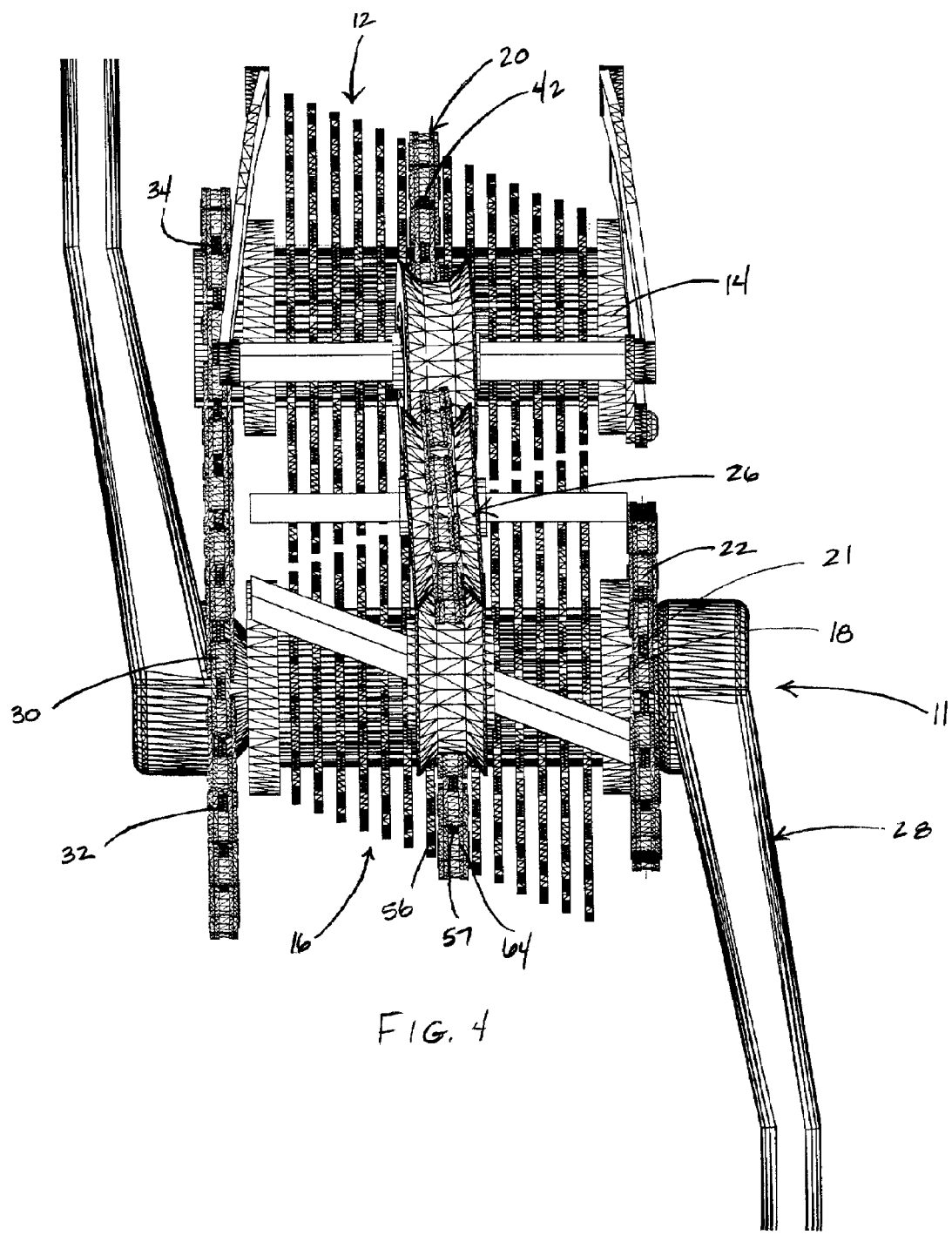
FIG. 4 is a front view of the transmission of FIG. 1 showing the derailleur engaging the low-tension side of the chain during the shift operation.
Figure 5:
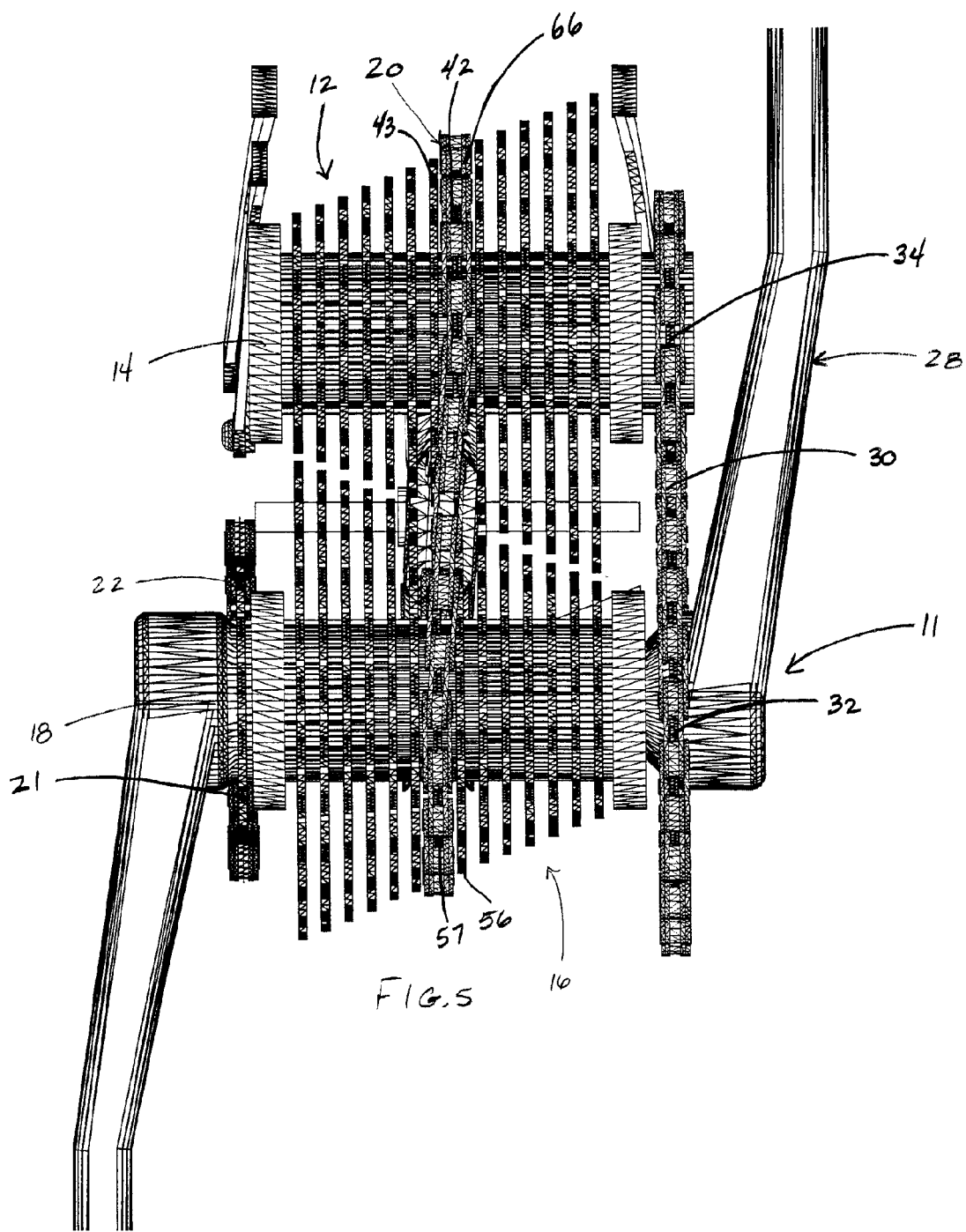
FIG. 5 is a rear view of the transmission of FIG. 1 showing a high-tension side of the chain during the shift operation.
Figure 6:
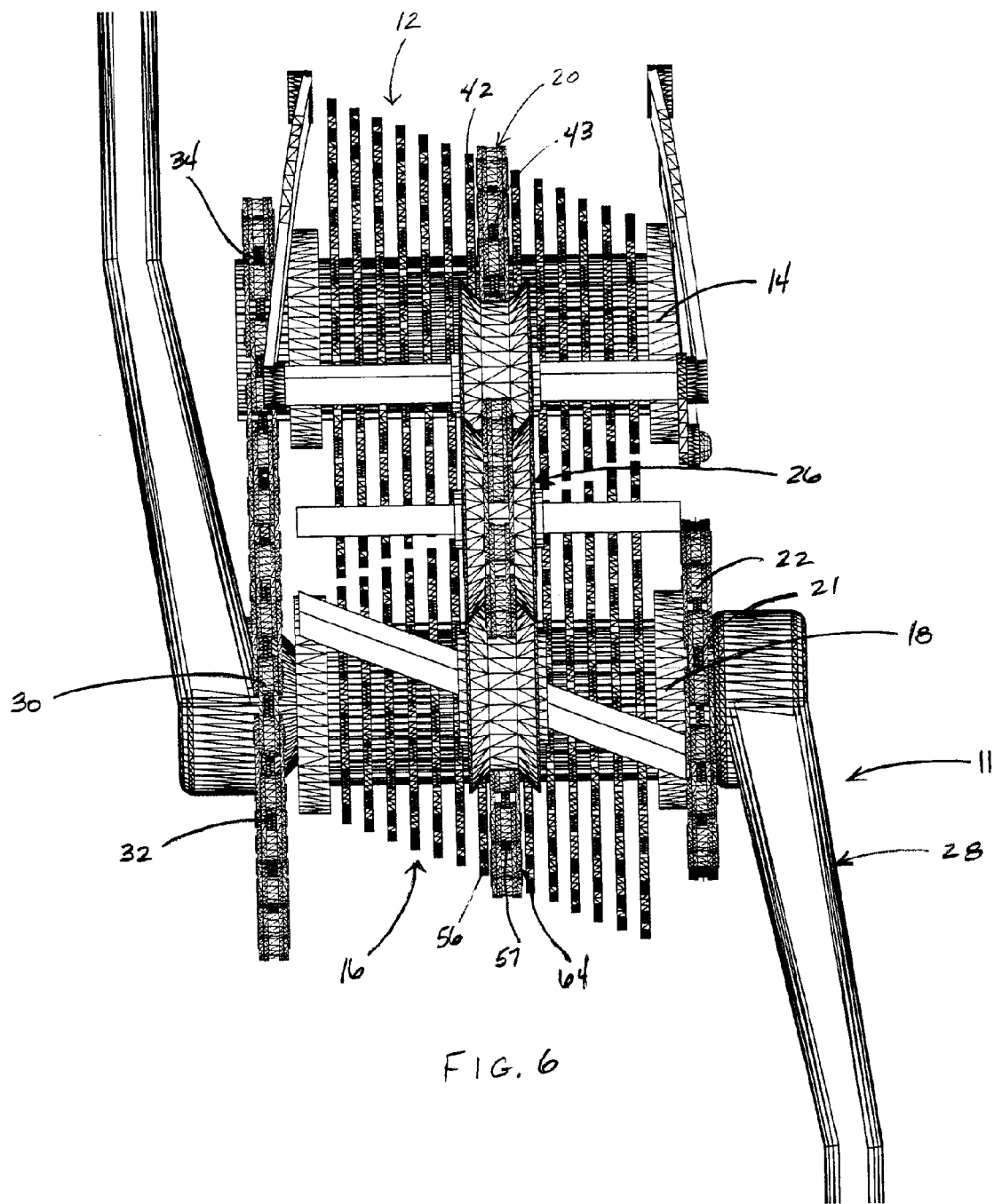
FIG. 6 is a front view of the transmission of FIG. 1 showing the derailleur engaging the low-tension of the chain after a completed shift operation.
Figure 7:
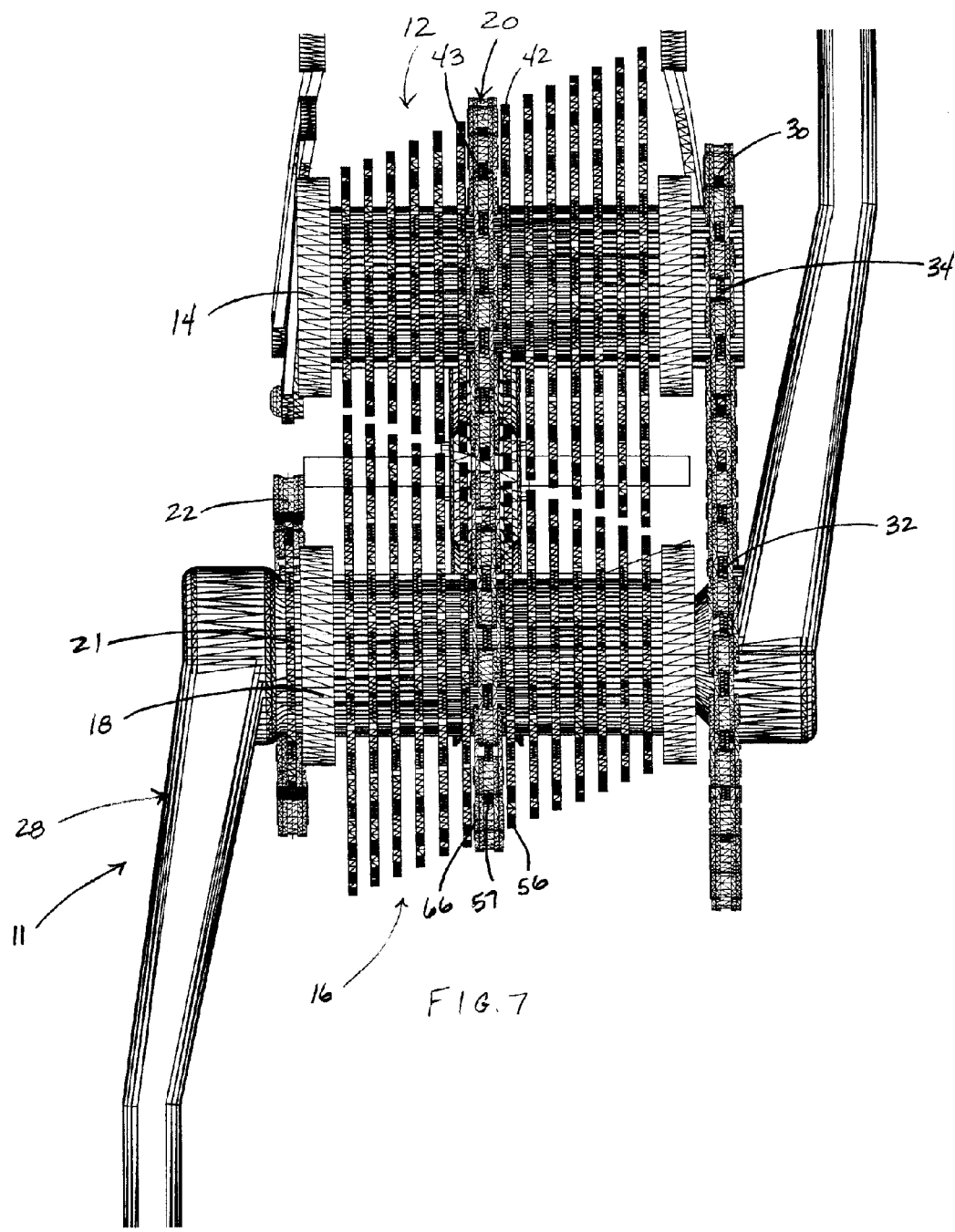
FIG. 7 is a rear view of the transmission of FIG. 1 showing the high-tension side of the chain after the completed shift operation.

FIG. 3 shows the chain 20 engaged with input cog 42 and output cog 56. Looking to FIGS. 4 and 5, upon actuation of the shifter, the control cable is pulled, resulting in movement of the derailleur 26 and the chain 20. FIG. 4 shows that, at midshift, the low-tension side of the chain 20 has been moved from output cog 56 to output cog 57 by the derailleur 26. FIG. 5 shows that, at midshift, the high-tension side of the chain 20 has not yet moved from the input cog 43. FIGS. 6 and 7 show the low-tension and high-tension sides 64, 66 of the chain 20, respectively, after the shift operation has been completed. The high-tension side 66 of the chain 20 has automatically moved from input cog 42 to input cog 43 without the aid of a derailleur.

The power from the output shaft 18 is transmitted to the wheel hub 24 by the final drive chain 22. The final drive chain 22 extends between the wheel input cog 21 mounted on an end of the output shaft 18 and the wheel output cog 23 mounted on the wheel hub 24. With this configuration, the chain alignment between the wheel input cog 21 and the wheel output cog 23 is substantially constant, resulting in less likelihood that the final drive chain 22 will fall off during extreme riding conditions. Further, efficiency and wear is improved since the wheel input cog 21 and the wheel output cog 23 are in direct alignment. The wheel input cog 21 and the wheel output cog 23 are preferably the same size to prevent chain torque from changing when the gear ratios are changed.

Figure 8:
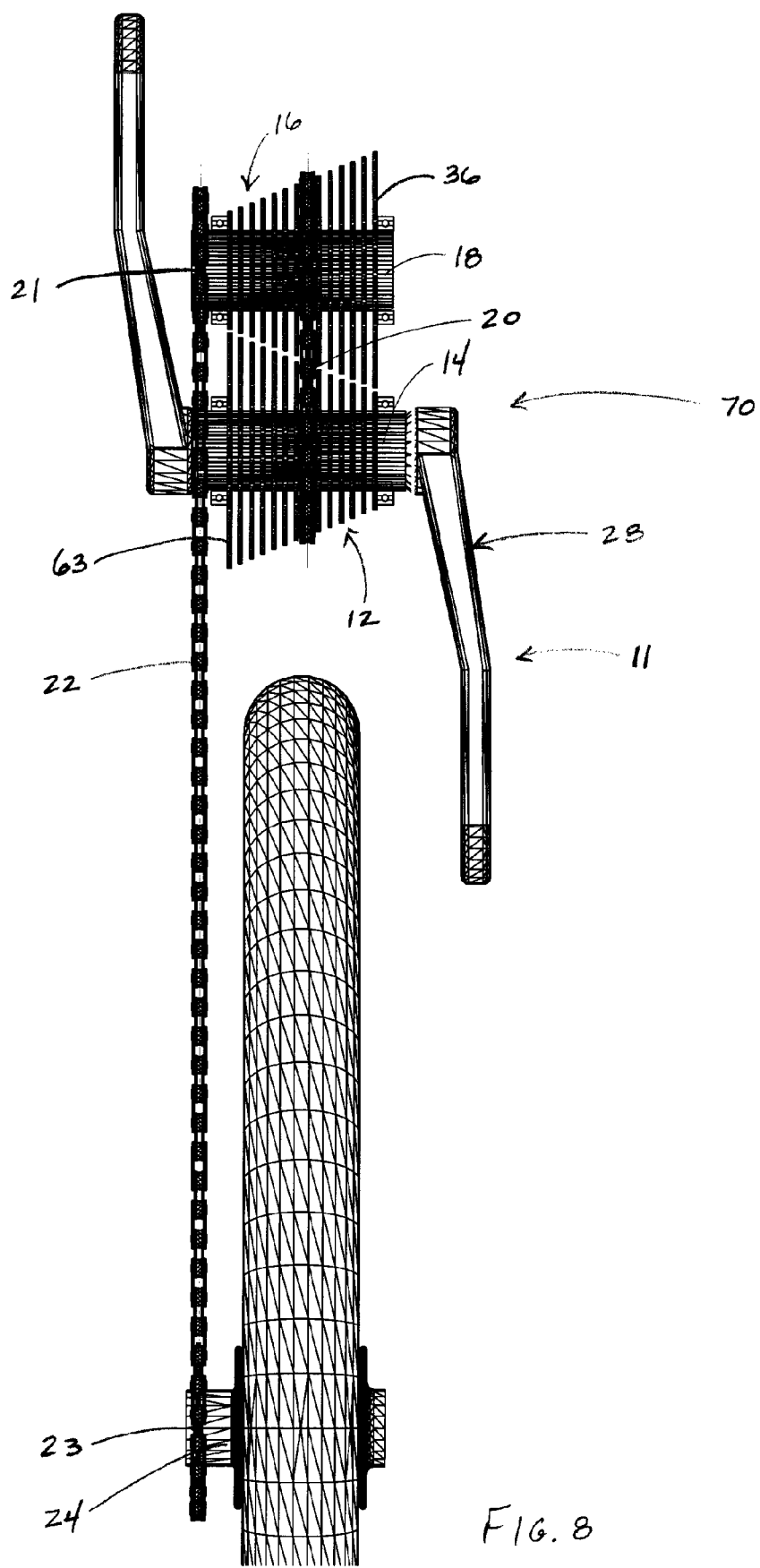
FIG. 8 is a rear view of a transmission in accordance with another embodiment of the present invention.

FIG. 8 depicts a bicycle transmission 70 in accordance with another embodiment of the present invention, similar to the embodiment of FIGS. 1-7, except that the crank chain 30, crank input and output cogs 32, 34 have been eliminated by locating the crank assembly 28 to be concentric with the input shaft 14 rather than the output shaft 18.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A transmission comprising:
   an input shaft;

an input cog assembly mounted to the input shaft, the input cog assembly including a plurality of varying diameter input cogs arranged sequentially;

an output shaft disposed substantially parallel to the input shaft;

an input device concentric with the output shaft and connected to the input shaft with a first flexible torque-transmitting element:

an output device connected to the output shaft with a second flexible torque-transmitting element;

an output cog assembly mounted to the output shaft, the output cog assembly including a plurality of varying diameter output cogs arranged sequentially;

a chain linking one of the plurality of the input cogs and one of the plurality of output cogs disposed opposite the one of plurality of input cogs for transmitting power from the input cog assembly to the output cog assembly, the chain, in operation, having a high-tension side and a low-tension side; and a derailleur engageable with the low-tension side of the chain to laterally urge the chain from a current output cog to a destination output cog, the input and output cog assemblies disposed in close proximity to each other and in a complementary arrangement relative to each other with the plurality of input cogs substantially aligned with the plurality of output cogs in a paired arrangement such that in operation the high-tension side of the chain automatically shifts to the input cog directly opposite the destination output cog after the derailleur laterally displaces the chain from the current output cog to the destination output cog.

2. The transmission of claim 1 wherein the input device comprises a crank assembly.

3. The transmission of claim 2 further comprising a crank input cog concentric with the output shaft, and a crank output cog mounted to the input shaft, the first flexible torque-transmitting element linking the crank input cog to the crank output cog.

4. The transmission of claim 1 wherein a gear ratio is defined by a pair of input and output cogs in substantial alignment with each other.

5. The transmission of claim 1 further comprising a housing mountable to a bicycle frame for enclosing at least a portion of the transmission.

6. The transmission of claim 1 wherein the output device is a bicycle wheel, the transmission further comprising a wheel input cog mounted to the output shaft, and a wheel output cog mounted to the wheel, the second flexible torque-transmitting element linking the wheel input and output cogs.

7. The transmission of claim 6 wherein the wheel input and output cogs we in substantial alignment with each other.

8. A transmission comprising:
an input shaft;
an input cog assembly mounted to the input shaft, the input cog assembly including a plurality of input cogs;

an output shaft disposed substantially parallel to the input shaft;

an input device concentric with the output shaft and connected to the input shaft with a first flexible torque-transmitting element;

an output device connected to die output shaft with a second flexible torque-transmitting element;

an output cog assembly mounted to the output shaft, the output cog assembly including a plurality of output cogs, one of said input and output cog assemblies comprising cogs of varying diameter arranged sequentially;

a chain linking one of the plurality of input cogs to one of the plurality of output cogs disposed opposite the one of the plurality of input cogs for transmitting power from the input cog assembly to the output cog assembly, the chain, in operation, having a high-tension side and a low-tension side; and a derailleur engageable with the low-tension side of the chain to laterally urge the chain from a current output cog to a destination output cog, the input and output cog assemblies disposed in close proximity to each other and in a complementary arrangement relative to each other with die plurality of input cogs substantially aligned with the plurality of output cogs in a paired arrangement such that in operation the high-tension side of the chain automatically shifts to the input cog directly opposite the destination output cog after the derailleur laterally displaces the chain from the current output cog to the destination output cog.

9. The transmission of claim 8 wherein the input device comprises a crank assembly.

10. The transmission of claim 9 further comprising a crank input cog concentric with the output shaft, and a crank output cog mounted to the input shaft, the first flexible torque-transmitting element linking the crank input cog to the crank output cog.

11. The transmission of claim 8 wherein a gear ratio is defined by a pair of input and output cogs in substantial aligmnent with each other.

12. The transmission of claim 8 further comprising a housing mountable to a bicycle frame for enclosing at least a portion of the transmission.

13. The transmission of claim 8 wherein the output device is a bicycle wheel, the transmission further comprising a wheel input cog mounted to the output shaft, and a wheel output cog mounted to the wheel, the second flexible torque-transmitting element linking the wheel input and output cogs.

14. The transmission of claim 13 wherein the wheel input and output cogs are in substantial alignment with each other.

\* \* \* \* \*